United States Patent
Bruno

(10) Patent No.: US 7,683,938 B2
(45) Date of Patent: Mar. 23, 2010

(54) IMAGE TAKING SYSTEM AND A TELEPHONE, A MOBILE TELEPHONE AND A TELEPHONE HOLDER USED BY SAID SYSTEM

(75) Inventor: Adrien Bruno, Grasse (FR)

(73) Assignee: France Telecom, Paris (FR)

( * ) Notice: Subject to any disclaimer, the term of this patent is extended or adjusted under 35 U.S.C. 154(b) by 632 days.

(21) Appl. No.: 10/591,237

(22) PCT Filed: Feb. 22, 2005

(86) PCT No.: PCT/FR2005/000413

§ 371 (c)(1),
(2), (4) Date: Oct. 31, 2006

(87) PCT Pub. No.: WO2005/096627

PCT Pub. Date: Oct. 13, 2005

(65) Prior Publication Data

US 2007/0188614 A1   Aug. 16, 2007

(30) Foreign Application Priority Data

Mar. 2, 2004   (FR) .................................. 04 02157

(51) Int. Cl.
*H04N 7/14* (2006.01)
*H04N 5/232* (2006.01)

(52) U.S. Cl. ............... 348/211.3; 348/14.01; 348/14.08
(58) Field of Classification Search ... 348/14.01–14.09, 348/14.1
See application file for complete search history.

(56) References Cited

U.S. PATENT DOCUMENTS

| 5,838,250 | A | * | 11/1998 | Maekawa | .................... 348/143 |
| 5,838,368 | A | | 11/1998 | Masunaga et al. | |
| 6,400,903 | B1 | * | 6/2002 | Conoval | ....................... 396/56 |
| 2003/0025791 | A1 | * | 2/2003 | Kaylor et al. | ................ 348/143 |
| 2003/0117497 | A1 | | 6/2003 | Pontoppidan et al. | |

FOREIGN PATENT DOCUMENTS

EP   0 884 905   12/1998

* cited by examiner

*Primary Examiner*—Tuan Ho
*Assistant Examiner*—Selam Gebriel
(74) *Attorney, Agent, or Firm*—Young & Thompson

(57) ABSTRACT

This image-taking system includes:
- at least one controllable motor (30, 32, 34) suitable for moving an image-taking point of a first mobile telephone in response to movement instructions received by the first mobile telephone, and
- a second telephone (42) including a module (60) for sending movement instructions to the first mobile telephone over a telephone network.

10 Claims, 4 Drawing Sheets

IMAGE TAKING SYSTEM AND A TELEPHONE, A MOBILE TELEPHONE AND A TELEPHONE HOLDER USED BY SAID SYSTEM

CROSS-REFERENCE TO RELATED APPLICATIONS

The present Application claim benefit of priority to and incorporates by reference PCT/FR2005/000413 filed Feb. 22, 2005 and French Patent Application 0402157 filed Mar. 2, 2004.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention relates to an image-taking system and a telephone, a mobile telephone and a telephone support used in this system.

2. Description of Related Art

More specifically, the invention relates to an image-taking system including:

a first mobile telephone, able to set up telephone links with another telephone over a telephone network, this mobile telephone being equipped with at least one image-taking point for taking images, and a second telephone able to display the images taken using the first mobile telephone.

Today, many mobile telephones are capable of taking a photo or of filming a scene and then transmitting it via the telephone network to a remote terminal such as another mobile telephone able to display the photo or the scene transmitted. To this end, mobile telephones include, for example, a lens forming an image-taking point. The lens is, for example, that of a photographic device or of a camera.

These mobile telephones also include a screen and means for restoring on this screen the image taken by the image-taking point.

In such image-taking systems, in order to align an image, the mobile telephone user must manually move the lens until the alignment of the image observed on the mobile telephone screen is correct. In known image-taking systems, it is therefore necessary, in order to align an image correctly, to provide on the mobile telephone the necessary technical means for viewing locally, i.e. on this mobile telephone, the image taken in order to be able to modify or validate the current alignment.

The invention aims to remedy this drawback by proposing an image-taking system using a telephone in which it is not necessary to locally view the image taken in order to align it.

BRIEF SUMMARY OF THE INVENTION

Therefore, a subject of the invention is an image-taking system, characterized in that it includes at least one controllable motor suitable for moving the or each image-taking point of the first mobile telephone in response to movement instructions received by the first mobile telephone, and in that the second telephone includes a module for sending movement instructions to the first mobile telephone over the telephone network.

In the abovementioned system, unlike known systems, it is the second telephone that is used to align images taken by the first telephone. Consequently, it is no longer necessary to view locally on the first telephone the images taken by this first telephone.

According to other additional features taken in isolation or in combination, the system according to the invention is characterized in that:

the at least one motor is secured to the first mobile telephone;

the or each image-taking point is mounted rotatably about first and second non-collinear axes of rotation, and the at least one motor is able to rotate the or each image-taking point about the first and second axes, the rotations about the first and second axes being controllable independently of each other;

it includes an independent support for the first mobile telephone, this independent support including mechanical means of coupling/uncoupling of the first mobile telephone with the support, and this support including the at least one motor, the at least one motor being able to move the coupling/uncoupling means in response to movement instructions received by the first mobile telephone so as to move the or each image-taking point;

the independent support includes a movable receptacle equipped with mechanical coupling/uncoupling means, and the at least one motor is able to move the receptacle in response to movement instructions received by the first mobile telephone;

the first mobile telephone includes two image-taking points spaced one from the other so as to be able to produce images in stereoscopy;

the or each image-taking point includes a zoom facility that can be adjusted in response to zoom instructions received by the first mobile telephone, and the second telephone includes a module for sending zoom instructions to the first mobile telephone over the telephone network;

the first mobile telephone includes at least one camera equipped with the or each image-taking point.

Other subjects of the invention are a telephone, a mobile telephone and a support adapted to be used in an image-taking system according to the invention.

BRIEF DESCRIPTION OF THE SEVERAL VIEWS OF THE DRAWINGS

The invention will be better understood on reading the following description given purely by way of example and with reference to the drawings in which.

DETAILED DESCRIPTION OF THE INVENTION

Figure 1:
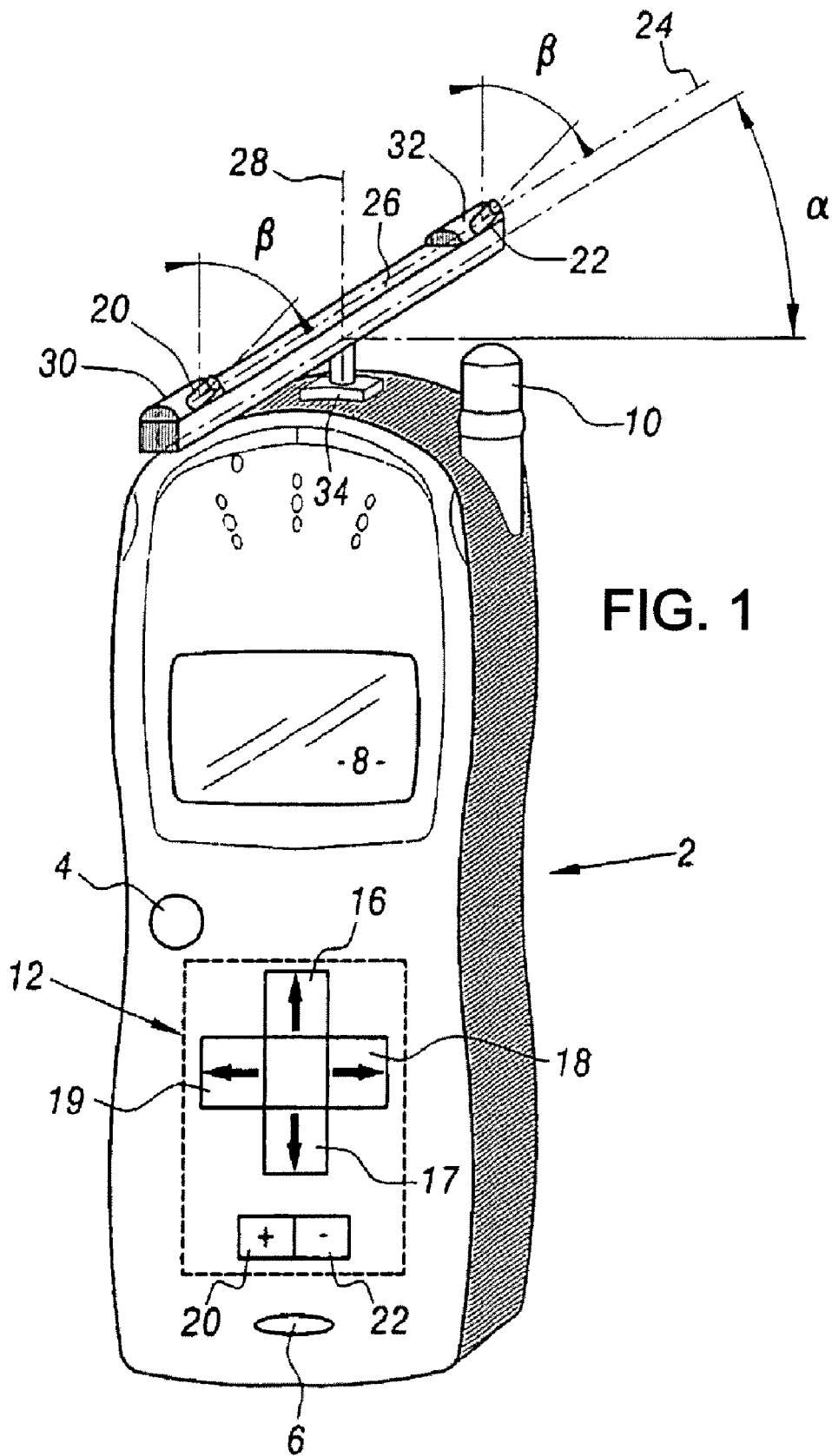
FIG. 1 is a schematic illustration of a mobile telephone able to be used in a system according to the invention.
Figure 2:
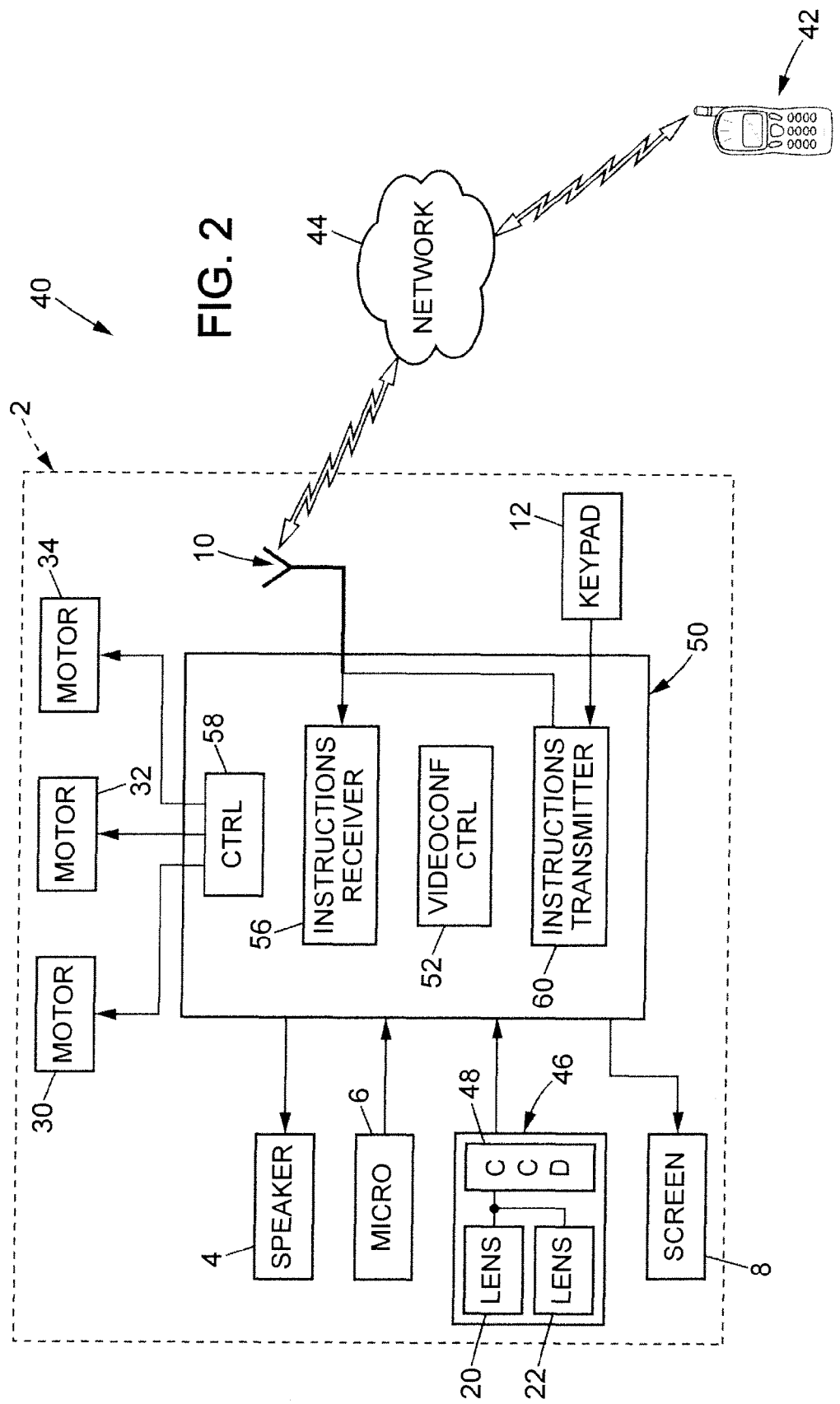
FIG. 2 is a schematic illustration of the architecture of a videotelephony system according to the invention.

FIG. 1 represents mainly the front face of a vertical mobile telephone 2 able to be used in the videotelephony system of FIG. 2. Here, only the components of the telephone 2 that are necessary for the understanding of the invention are described in detail. In addition, the internal architecture of this telephone will be described in more detail with reference to FIG. 2.

In order to enable usage in a videotelephony system, the telephone 2 includes:
- a speaker 4,
- a microphone 6, and
- a screen 8.

Here, the screen 8 is a stereoscopic three-dimension screen. Such screens can be used to produce a three-dimensional effect without the use of special glasses. To this end, these screens are based on the "parallax barrier" method. For further information, the reader may refer to the report: "3D Consortium sub committee activities joint press conference, Members Exhibition", dated Sep. 10, 2003, and accessible online at the following address:

http://www.3dc.qr.jp/english/index.html.

More specifically the reader may consult the article by Professor Matsuyama of Kyoto University at this address.

The telephone 2 is also equipped with an antenna 10, for picking up radio frequencies, and a keypad 12.

Only the keys on the keypad 12 that are used to implement the invention have been represented here.

Thus, the keypad 12 includes four movement keys 16 to 19, respectively up, down, right and left. The keypad 12 also includes a zoom-in key 20 and a zoom-out key 22.

In order to use it in a videotelephony system, the telephone 2 also includes an image-taking device. In this case, so as to be able to produce stereoscopic images, this image-taking device includes two lenses 20 and 22 separated from one another by a distance equal, for example, to 64 mm. These lenses 20 and 22 form the image-taking points of the telephone 2. The lenses 20 and 22 can be rotated about a common horizontal axis 24. This axis 24 is secured to a horizontal beam 26, which itself is mounted rotatably about a vertical axis 28 secured to a chassis of the telephone 2. The focal distance of these lenses 20 and 22 can be controlled so as to zoom in or zoom out.

In order to rotate the lenses 20 and 22 about the axis 24, the telephone 2 includes two controllable electric motors 30 and 32 associated with the lenses 20 and 22 respectively.

The telephone 2 also includes a controllable motor 34 suitable for rotating the beam 26 about the axis 28. Thus, by controlling these motors, it is possible to move the lenses 20 and 22, and therefore the corresponding image-taking points, relative to the chassis of the telephone 2.

Here, the angular position of the beam 26 relative to a reference position is represented by an angle α and the angular position of the lenses 20 and 22 relative to the vertical is represented by an angle β.

FIG. 2 represents a videotelephony system denoted by the general reference 40 which system is intended to be used for realizing videoconferences using mobile telephones. To this end, this system 40 includes the telephone 2 and another mobile telephone 42 each able to set up a radio link for transmitting information over a telephone network 44. This network 44 is, for example, a GSM (Global System for Mobile communications) network, a GPRS (General Packet Radio Service) network, a UMTS (Universal Mobile Telecommunications System) network or a WiFi network (wireless local area network).

The components of the telephone 2 already described with reference to FIG. 1 bear the same numerical labels.

In FIG. 2, the image-taking device of the telephone 2 is labeled 46 and includes the two lenses 20 and 22 connected to the input of a CCD (Charge-Coupled Device) sensor 48 composed of photosensitive elements appropriate for converting the light signals picked up by the lenses 20 and 22 to digital signals. This device 46 is adapted to receive zoom instructions and to execute, in response, a zoom-in or a zoom-out operation.

So as to manage the setting-up and the maintaining of a telephone link with another telephone over the network 44, the telephone 2 includes a processing unit 50 connected to the various items of equipment described previously. In particular, this processing unit 50 includes a conventional module 52 for managing a videoconference set up between the telephone 2 and another telephone over the network 44. The functionalities of this module 52 will be described in more detail with reference to the method in FIG. 3.

The processing unit 50 also includes a module 56 for receiving movement instructions transmitted over the network 44 and through the antenna 10. This module 56 is able to extract from the received data flow the movement instructions intended to move the image-taking points 20, 22. So as to distinguish between the movement instructions and the channel and image data, a specific communication channel for the movement instructions is provided. It is also possible have these movement instructions preceded by a specific header enabling them to be identified.

The module 56 is also able to receive zoom-in or zoom-out instructions transmitted over the network 44. These zoom instructions are directed by the module 56 to the device 46.

A module 58 for controlling motors 30, 32 and 34 is provided in the processing unit 50. This module 58 is suitable for controlling the motors 30, 32 and 34 according to the movement instructions received by the module 56.

Lastly, the processing unit 50 includes a module 60 for sending movement instructions through the antenna 10 and over the network 44. This module 60 is associated with the keypad 12, and more specifically with the keys 16 to 19, 20 and 22. The module 60 is adapted to generate the following movement instructions:

a movement instruction bringing about a rotation of the beam 26 about the axis 28 rightward if the key 18 is pressed and leftward if the key 19 is pressed, and a movement instruction bringing about an identical rotation about the axis 24 of the lenses 20 and 22 upward if the key 16 is pressed and downward if the key 17 is pressed.

The module 60 is also able to send through the antenna 10 and over the network 44 a zoom-in instruction if the key 20 is pressed and a zoom-out instruction if the key 22 is pressed.

The telephone 42 is similar to the telephone 2 and includes the same components as those described for the telephone 2 with reference to FIGS. 1 and 2.

Figure 3:
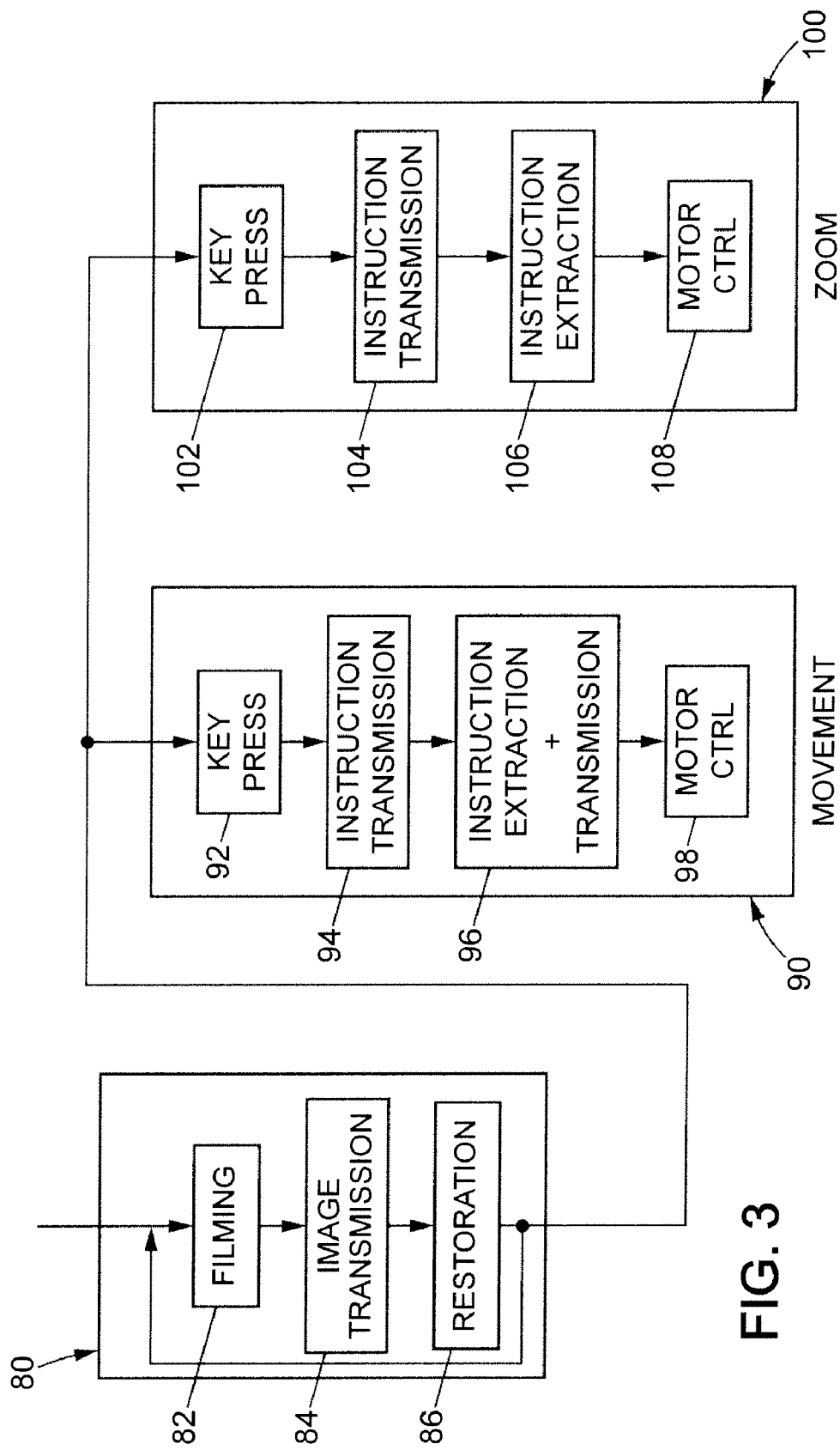
FIG. 3 is a flow chart of a videotelephony method according to the invention.

The operation of the system 40 will now be described with reference to the method in FIG. 3.

Initially, the user of the telephone 2 initializes and activates in a conventional manner a process 80 for a videoconference between the telephones 2 and 42. Here, in order to simplify the description, the user of the telephone 2 will be referred to as user A and the user of the telephone 42 will be referred to as user B.

During the process 80, the telephone 2 is constantly filming, at a step 82, the user A using the device 46. At the same time, and in a similar manner, the telephone 42 films the user B.

These filmed images are immediately transmitted in real time, at a step 84, to the other telephone over the network 44. For each telephone, the transmission and the reception of filmed voice and image data are managed by the module 52.

As voice data and image data are received by the module 52, the latter controls, at a step 86, the restoration of the voice data through the speaker 4 and the display of filmed images on the screen 8.

At any moment during the execution of the process 80, one of the users can proceed to modify the alignment of the received images by modifying the position of the image-taking points of the image-taking device used to film them. To this end, a user, for example the user B in this case, proceeds to a process 90 for aligning received images.

At the start of this process 90, the user B presses, at a step 92, one of the keys 16 to 19 on his telephone. The module 60 of the telephone 42 then sends, at a step 94, the corresponding movement instruction to the telephone 2 over the network 44.

The receive module 56 of the telephone 2 extracts, at a step 96, this received movement instruction and transmits it to its control module 58.

The module 58 of the telephone 2 then controls, at a step 98, the motors 30, 32 and 34 so as to move its image-taking points 20, 22 about the axes 24 and 28 by an angle α and by an angle β corresponding to the received movement instruction.

The movement of the image-taking points 20, 22 of the telephone 2 results in a modification of the alignment of the images received by the telephone 42.

Also at any moment during the execution of the process 80, one of the users can proceed to a process 100 for zooming in or zooming out. Here, it is assumed that this process 100 is activated by the user A.

Initially at the start of the process 100, the user A presses one of the keys 20 or 22 at a step 102. The module 60 then sends, at a step 104, the zoom instruction corresponding to the pressed key to the mobile telephone 42 over the network 44.

The receive module of the telephone 42 extracts, at a step 106 similar to step 96, the received zoom instruction. This zoom instruction is transmitted to the image-taking device of the telephone 42, which performs, at a step 108, the zoom operation corresponding to the received zoom instruction.

The image-taking system described here in the specific case of a videotelephony system can be used to avoid having to simultaneously display on the screen 8 an image of the remote party and a reduced image of the local user. Specifically, in known videotelephony systems, so as to enable each user to maintain a satisfactory alignment during a videoconference, the screen of each mobile telephone is divided into two windows. The larger window is used to display the image of the remote party while the smaller window is used to display a reduced copy of the images transmitted to the remote party. The small window allows the user of the telephone to constantly check that the alignment of the transmitted images is satisfactory and, if it is observed that this is not the case, allows the user himself to manually modify the alignment of the transmitted images by modifying the position of the image-taking point of his mobile telephone. The system 40 can be used to avoid resorting to this small window on each of the screens of the mobile telephones involved in the videoconference.

Figure 4:
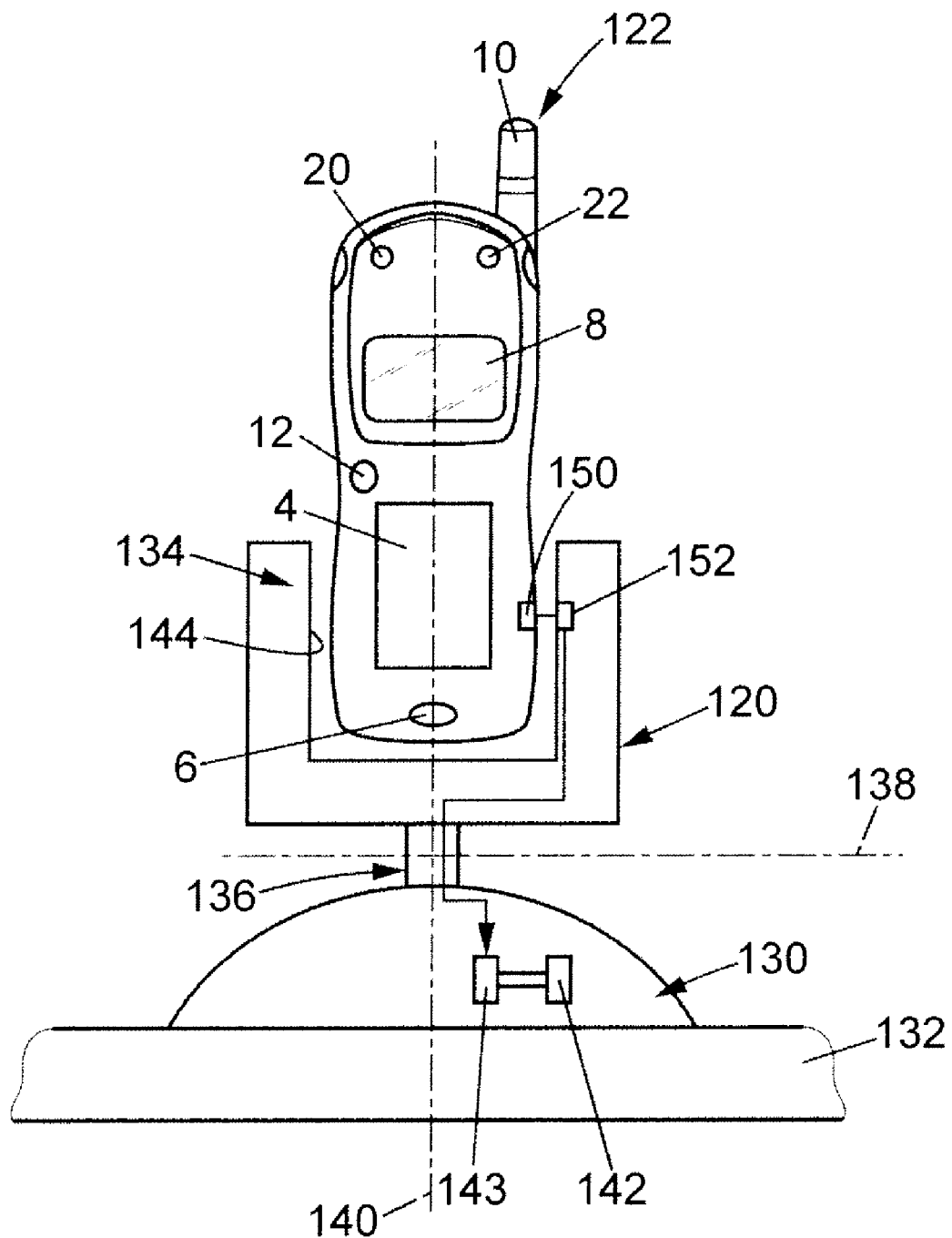
FIG. 4 is a schematic illustration of a variant of the telephone of FIG. 1.

The motors 30, 32 and 34 have been described here for the particular case in which they are secured to the mobile telephone. FIG. 4 represents a variant in which these motors are secured to an independent support 120 suitable for moving the or each image-taking point of a telephone 122 equipped to set up a videoconference.

The telephone 122 is, for example, identical to the telephone 2 except for the fact that the lenses 20 and 22 are rigidly fixed to the chassis of the telephone 122 with no degrees of freedom. This telephone 122 therefore does not include motors suitable for moving lenses 20 and 22 relative to the telephone chassis. The components of the telephone 122 that are identical to those of the telephone 2 bear the same labels here.

The support 120 includes a fixed chassis 130 intended to be fixed to a stable surface such as a horizontal platform 132. The chassis 130 is fixed to the platform 132 using conventional fastening means.

The support 120 also includes a receptacle 134 mechanically connected to the chassis 130 via a joint 136. The joint 136 is designed so as to enable a swiveling of the receptacle 134 about a horizontal axis 138 and a rotation about a vertical axis 140. So as to move the receptacle 134 about the axes 138 and 140, the support 120 includes one or more motors 142 under the control of a control module 143.

The receptacle 134 includes mechanical means 144 of coupling and uncoupling of the telephone 122 with the receptacle 134. Here these means 144 are formed, for example, by a housing 144 suitable for receiving the telephone 122 in a removable manner.

To control the movements of the receptacle 134 according to movement instructions received by the mobile telephone 122, the mobile telephone and the support 120 each include an interface, 150 and 152 respectively, through which the movement instructions received by the mobile telephone 122 are transmitted to the control module 143.

Typically, the support 120 is a portable support that can be transported by the user.

The operation of the image-taking system represented in FIG. 4 is identical to that described with reference to the method in FIG. 3. However, in this variant, it is the whole telephone that is moved in response to movement instructions and not the lenses 20 and 22 only.

FIG. 4 represents a fixed support. As a variant, the fixed support is replaced by a movable support equipped, for example, with wheels rotationally driven by the motor 142. Thus, in this variant, to move the or each image-taking point, the support drives along the platform 132 in response to movement instructions.

The systems of FIGS. 2 and 4 have been described for the particular case in which the image-taking devices are capable of filming a scene. As a variant, the image-taking device is capable only of taking a photo.

The man-machine interface enabling the mobile telephone user to input movement instructions or zoom instructions on his mobile telephone has been described here for the particular case in which this interface is formed of keys 16 to 19 and 20, 22. As a variant, these keys are replaced by a voice interface by virtue of which the movement and zoom instructions are dictated by the user.

The telephone 42 has been described as being a mobile telephone too. However, as a variant, this telephone 42 is a fixed telephone, a videoconferencing device or a personal computer suitable for fulfilling the same functionalities as those of the telephone 42.

The invention claimed is:

1. An image-taking system including:
   a first mobile telephone able to set up at least one telephone link with a second telephone over a telephone network, this mobile telephone being equipped with at least one image-taking point for taking images, and
   the second telephone being able to display the images taken using the first mobile telephone,
   wherein the first telephone includes at least one controllable motor suitable for moving the image-taking point in response to movement instructions received by the first mobile telephone, and wherein:

the second telephone includes a module for sending the movement instructions to the first mobile telephone over the telephone network, the image-taking point is mounted rotatably about first and second non-collinear axes of rotation, and the at least one motor is able to rotate the or each image-taking point about the first and second axes, the rotations about the first and second axes being controllable independently of each other.

2. The system according to claim 1, wherein the at least one motor is secured to the first mobile telephone.

3. The system according to claim 1, wherein it includes an independent support for the first mobile telephone, this independent support including mechanical means of coupling/uncoupling of the first mobile telephone with the support, and wherein this support includes the at least one motor, the at least one motor being able to move the coupling/uncoupling means in response to movement instructions received by the first mobile telephone so as to move the image-taking point.

4. The system according to claim 3, wherein the independent support includes a movable receptacle equipped with mechanical coupling/uncoupling means, and wherein the at least one motor is able to move the receptacle in response to movement instructions received by the first mobile telephone.

5. The system according to claim 1, wherein the first mobile telephone includes two image-taking points spaced one from the other so as to be able to produce images in stereoscopy.

6. The system according to claim 1, wherein the image-taking point includes a zoom facility that can be adjusted in response to zoom instructions received by the first mobile telephone, and wherein the second telephone includes a module for sending zoom instructions to the first mobile telephone over the telephone network.

7. The system according to claim 3, wherein the first mobile telephone includes at least one camera equipped with the image-taking point.

8. A first mobile telephone able to set up at least one telephone link with a second telephone over a telephone network, this first mobile telephone being equipped with at least one image-taking point for taking images, wherein:

the first telephone includes at least one controllable motor suitable for moving the image-taking point in response to movement instructions received over the telephone network, the image-taking point is mounted rotatably about first and second non-collinear axes of rotation, and the at least one motor is able to rotate the image-taking point about the first and second axes, the rotations about the first and second axes being controllable independently of each other.

9. A support for a mobile telephone equipped with at least one image-taking point for taking images, wherein it includes:

means for the coupling/uncoupling of the mobile telephone with the support, and at least one controllable motor suitable for moving the coupling/uncoupling means in response to movement instructions received by the mobile telephone so as to move the image-taking point, and the at least one motor is able to rotate the image-taking point about first and second non-collinear axes, the rotations about the first and second axes being controllable independently of each other.

10. A second telephone able to set up at least one telephone link with a first mobile telephone over a telephone network, this second telephone including a screen for displaying images taken using the first mobile telephone, this first mobile telephone being in accordance with claim 8, wherein this second telephone is equipped with a module for sending movement instructions to the at least one motor of the first mobile telephone or of the support, over the telephone network.

* * * * *